April 20, 1937.  P. C. TEMPLE  2,078,106

VALVE MECHANISM

Filed Aug. 2, 1933  4 Sheets-Sheet 1

INVENTOR
PAUL C. TEMPLE
BY
Albert G. Blodgett
ATTORNEY

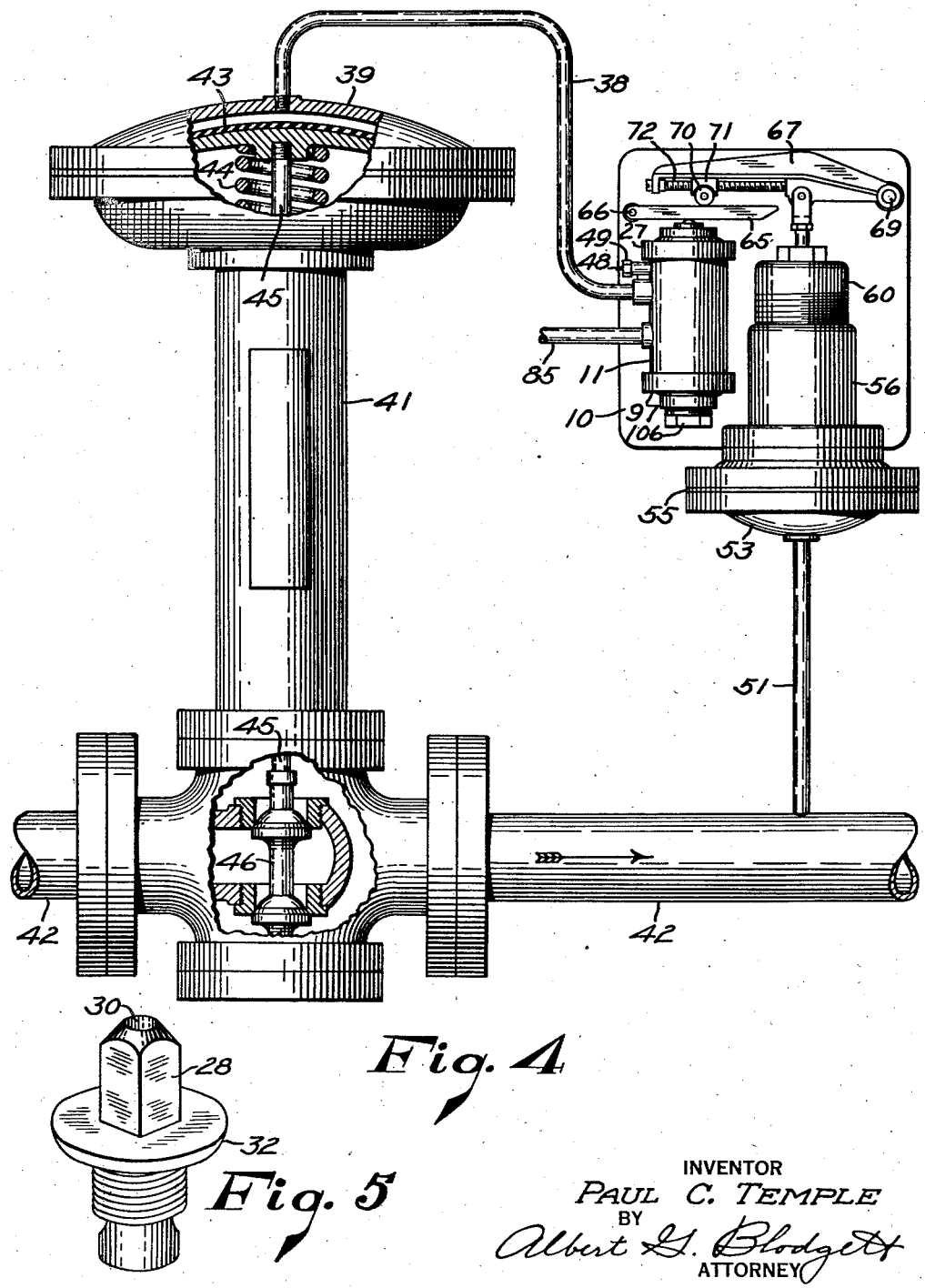

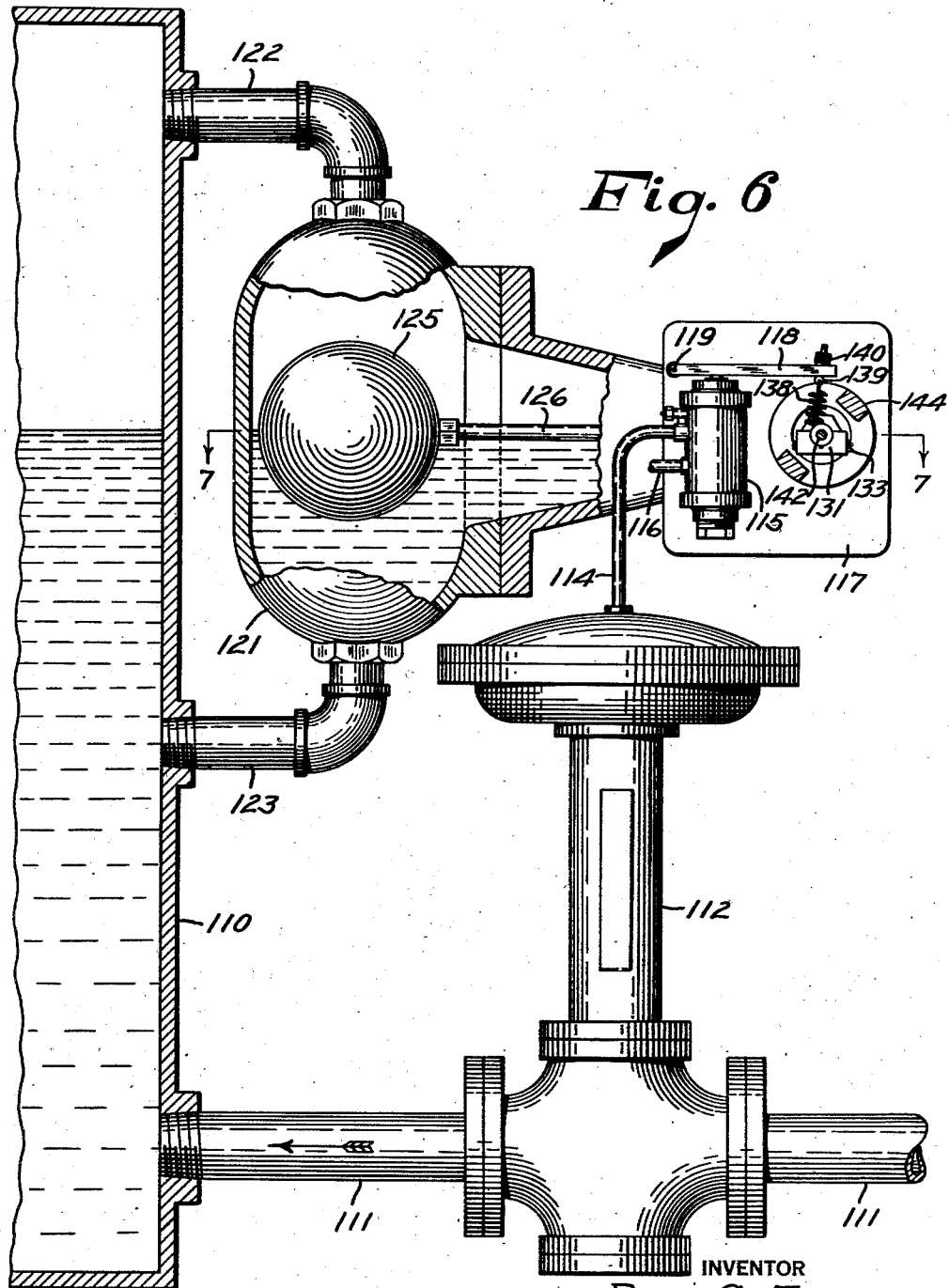

April 20, 1937.   P. C. TEMPLE   2,078,106
VALVE MECHANISM
Filed Aug. 2, 1933   4 Sheets-Sheet 4

INVENTOR
PAUL C. TEMPLE
BY
Albert G. Blodgett
ATTORNEY

Patented Apr. 20, 1937

2,078,106

UNITED STATES PATENT OFFICE 2,078,106

VALVE MECHANISM

Paul C. Temple, Decatur, Ill., assignor to A. W. Cash Company, Decatur, Ill., a corporation of Delaware Application August 2, 1933, Serial No. 683,365

3 Claims. (Cl. 50—10)

This invention relates to valve mechanisms, and more particularly to a mechanism suitable for the automatic control of fluid pressures. In some cases the fluid being controlled may be used to actuate a controller, such as a valve, which in turn may perform various functions, such as controlling the pressure of fluid delivered from the valve, or the supply of liquid to a tank, etc.

It has previously been proposed to utilize a so-called pilot valve mechanism to control the pressure of a fluid which is applied to the flexible operating diaphragm of a so-called motor valve, these parts being so arranged that the motor valve will open to a predetermined degree dependent upon the controlling pressure. These prior pilot valve mechanisms have been so constructed that they require a continuous flow of the operating fluid, even when the motor valve is held stationary. This is wasteful and in many cases dangerous, for gas under pressure is often used as the operating fluid. In addition to this disadvantage, prior pilot valve mechanisms are complicated and expensive, they lack sensitivity, and they have no means for adjusting the operating range, that is, the amount of variation in the condition under control necessary to produce a full movement of the motor valve.

It is accordingly one object of the invention to overcome these difficulties and to provide a comparatively simple and inexpensive pilot valve mechanism which will use a minimum of operating fluid, and particularly to provide a mechanism which will use operating fluid only when it functions to increase the effective pressure on the pressure actuated controller.

It is a further object of the invention to provide a pilot valve mechanism which can be readily adjusted to vary its operating range.

It is a further object of the invention to provide a pilot valve mechanism which can be readily adapted to respond to various controlling conditions, such as the pressure of fluid in a pipe, or the level of liquid in a tank, etc.

It is a further object of the invention to provide a pilot valve mechanism including a lever system to transmit force and means to prevent the application of an excessive load to the lever system.

It is a further object of the invention to provide a simple and inexpensive valve mechanism which includes a fluid inlet control means and a fluid outlet control means, both of said means being controlled by a single fluid pressure responsive device.

It is a further object of the invention to provide a simple and inexpensive valve mechanism which will function both as a pressure reducing valve and as a pressure relief valve.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a vertical section through a pilot valve mechanism adapted to function in response to variations in a controlling fluid pressure;

Fig. 4 is an elevation of the pilot valve mechanism connected to a motor valve, the latter being shown in partial section for clearness of illustration;

Fig. 5 is a perspective view of a combined exhaust valve and valve pusher post;

Fig. 6 is an elevation of a modified pilot valve mechanism connected to a motor valve to control the level of liquid in a tank, certain parts being shown in section on the line 6—6 of Fig. 7;

Figures 1, 2, 3:
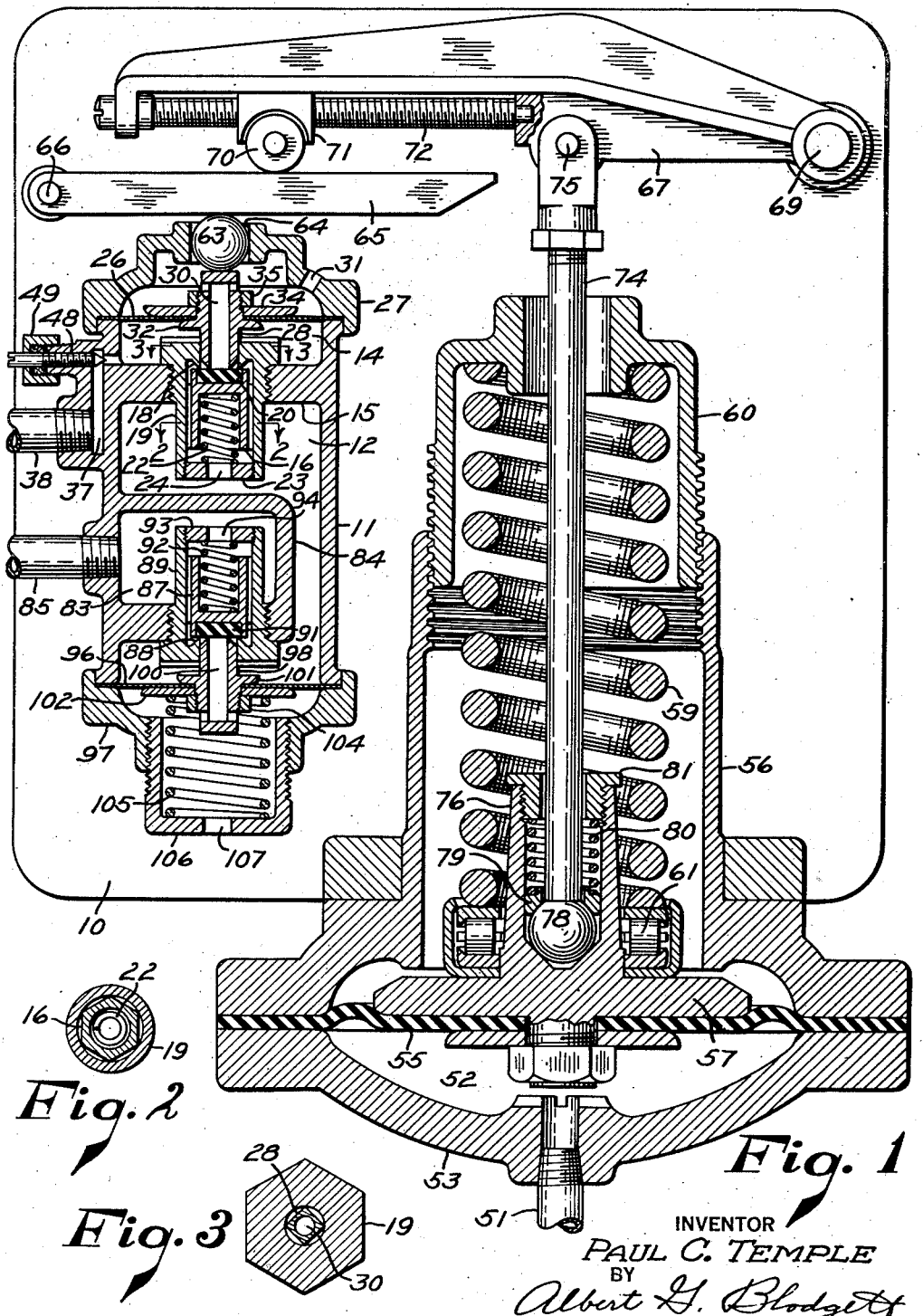
Fig. 2 is a section on the line 2—2 of Fig. 1.
Fig. 3 is a section on the line 3—3 of Fig. 3.

The embodiment illustrated in Figs. 1 to 5 inclusive comprises a supporting frame shown as a flat vertical plate 10 on whch is mounted a hollow casing 11 shaped to provide an inlet chamber 12 and an outlet chamber 14 separated by a partition 15. The inlet chamber 12 is supplied with fluid under pressure by a means which will be more fully described hereinafter, and the flow from the inlet chamber into the outlet chamber 14 is controlled by a valve member or piston 16 which cooperates with an annular valve seat 18. The seat 18 is formed in a valve cage 19 which is screw-threaded into the partition 15. The valve piston is slidably supported in the cage and is preferably provided with a disk 20 at its upper end which in closed position contacts with the valve seat. The outside of the valve piston is hexagonal, as shown in Fig. 2, to allow a space for the flow of fluid between the valve piston and the cage. While the fluid pressure serves to bias the valve toward closed position, I prefer to supplement this action by means of a small coiled compression spring 22 mounted in the hollow interior of the valve piston and resting at its lower end on a plug 23 screw-threaded to the valve cage 19. The plug 23 is formed with an opening 24 therethrough to allow fluid to enter the valve cage from the chamber 12.

In order to control the fluid pressure in the chamber 14, I provide a flexible diaphragm 26 which forms one wall of the chamber. This diaphragm is clamped at its periphery between the casing 11 and a cap 27. The diaphragm 26 is located in a plane perpendicular to the direction of movement of the valve member 16, and these parts are connected by means of a pusher post 28 mounted on the diaphragm and extending downwardly through the upper portion of the valve cage 19 and into contact with the disk 20. The valve cage forms a guideway for the pusher post, and the outside of the post is square, as shown in Fig. 3, to allow flow of fluid between these parts. A central longitudinal passage 30 is provided through the pusher post, and the lower end of the pusher post is beveled to provide a comparatively sharp annular surface for contact with the disk 20. These various parts are so arranged that if the diaphragm moves upwardly and carries the lower end of the pusher post out of contact with the valve disk 20, the fluid may escape through the passage 30 into the space above the diaphragm and thence to atmosphere through a vent 31 in the cap 27. The pusher post 28 thus forms a relief or exhaust valve as well as an operating means for the inlet valve 16. The pusher post is shown provided with a flange 32 which contacts with the lower surface of the diaphragm. An annular pressure plate 34 contacts with the upper surface of the diaphragm, and these parts are all held in the proper relationship by means of a nut 35 screw-threaded to the pusher post above the pressure plate.

The chamber 14 is connected by means of a passage 37 and a pipe 38 with the diaphragm chamber 39 of a fluid pressure actuated controller shown as a motor valve 41 which controls the flow of fluid in a pipe 42. The pressure in the diaphragm chamber 39 is effective on a diaphragm 43 which is loaded by means of a coiled compression spring 44 and connected by means of a rod 45 to a balanced valve member 46. With this construction, an increased pressure in the chamber 39 will force the diaphragm 43 and valve member 46 downwardly, thus opening the valve and allowing an increased flow in the pipe 42. In one construction which I have found satisfactory, a change of 13 pounds in pressure per square inch is necessary to give full travel to the motor valve, the valve being wide open at 15 pounds and fully closed at 2 pounds. Of course intermediate pressures will result in corresponding intermediate positions for the valve member 46. In order to control the speed of movement of the motor valve, I have shown an adjustable needle valve 48 mounted in the passage 37 and extending outwardly through a stuffing box 49.

The diaphragm 26 is loaded or supported against the fluid pressure in the chamber 14 by means of a force which varies in accordance with changes in a condition which is to be controlled, and the parts are so arranged that changes in this force will change the pressure in chamber 14, which will cause the motor valve to move in the proper direction to counteract the change in the condition. For this purpose I provide a member which moves in accordance with variations in the condition to be controlled, and I connect this member mechanically with the diaphragm 26. In the embodiment illustrated, the condition to be controlled is the fluid pressure in the pipe 42 at the delivery side of the motor valve 41. This fluid pressure is transmitted through a pipe 51 to a diaphragm chamber 52 formed by a cap 53 and a flexible diaphragm 55, the latter constituting the movable member referred to above. This diaphragm is clamped peripherally between the cap 53 and a flanged cylindrical casing 56 mounted on the plate 10 and laterally adjacent to the casing 11. A pressure plate 57 contacts with the upper surface of the diaphragm, and a coiled compression spring 59 extends upwardly from the pressure plate, the upper end of the spring bearing against a hollow adjusting plug 60 screw-threaded to the casing 56. By adjusting the plug 60, the loading on the diaphragm may be varied as desired. I preferably interpose a roller thrust bearing 61 between the lower end of the spring 59 and the pressure plate 57, to facilitate adjustment by decreasing the frictional resistance.

The diaphragms 55 and 26 are mechanically connected, preferably by a means having an adjustable mechanical advantage. For this purpose I prefer to utilize a construction including a pivotally mounted lever, which is so arranged that the effective length of the lever may be varied as desired. In the drawings I have shown a sphere 63 mounted in a cylindrical opening 64 in the cap 27 and contacting with the top of the pusher post 28. A horizontal lever 65 is mounted above and in conact with the sphere 63, the lever being pivotally connected at one end to the plate 10 by means of a pin 66. A second horizontal lever 67 is mounted above the lever 65, the lever 67 being pivotally connected at one end to the plate 10 by means of a pin 69. The levers are so arranged that their free ends extend toward one another, and an adjustable connection is provided between them so that the mechanical advantage of the lever system may be varied. This connection comprises a roller 70 mounted on a nut 71 and contacting with the top surface of the lower lever 65. This nut 71 is supported by a horizontal screw 72 mounted on the upper lever 67. By rotating the screw 72, the nut 71 and roller 70 can be moved horizontally, thus varying the effective lengths of the levers. A vertical rod 74 extends upwardly from the diaphragm plate 57 and is connected at its upper end to the upper lever 67 by means of a pin 75.

It will be understood that in the normal operation of the mechanism, the rod 74 is subjected to a slight tensional stress which is just sufficient to balance the fluid pressure on the diaphragm 26. This tensional stress also balances the difference between the downward force of the spring 59 and the upward force of the fluid pressure beneath the diaphragm 55. Under conditions of no load, with entire failure of the fluid pressure in the chamber 52, there would be a tendency for the spring 59 to impart an excessive tensional stress to the rod 74 and possibly damage the lever system. In order to avoid this danger and at the same time prevent any excess friction caused by lateral bending stresses in the rod 74, I preferably provide a ball and socket connection between the rod and the pressure plate 57, and arrange the parts in such a way that they will yield whenever the tension in the rod increases beyond a predetermined amount which is slightly above the maximum required in normal operation. For this purpose I have shown the pressure plate 57 shaped to provide an upwardly extending sleeve 76 forming a socket which receives a sphere 78 formed on the lower end of the rod 74. The sphere 78 is held in place in the socket by means of a collar 79 which is urged downwardly by a coiled compression spring 80. The upper end of this spring bears against an annular plug 81 screw-threaded to the upper end of the sleeve 76. The spring 80 is strong enough to hold the sphere 78 firmly in position in the socket during normal operation, but if the pressure in the chamber 52 decreases considerably the spring 80 will yield and prevent the force of the powerful spring 59 from being applied to the lever system.

It will now be understood that with the construction as so far described, a definite fluid pressure in the chamber 52, within the range of the apparatus, will result in a predetermined fluid pressure in the chamber 14 and also in the diaphragm chamber 43 of the motor valve, and this is true irrespective of variations in the pressure in chamber 12, so long as this pressure remains above the 15 pounds required to fully open the motor valve. If the roller 70 is adjusted as far as possible to the left, the range will be at a maximum, and if the spring 59 is so adjusted that say 100 pounds pressure in the chamber 52 will produce 2 pounds pressure in the chamber 14, which will result in closure of the motor valve, the pressure in chamber 52 will have to drop to perhaps 95 pounds before the pressure in the chamber 14 will increase to the 15 pounds necessary to open the motor valve fully. On the other hand, if the roller 70 is adjusted as far as possible to the right, the range will be at a minimum, and the pressure in chamber 52 need decrease only a very small amount to increase the pressure in chamber 14 from 2 to 15 pounds. The range can be readily adjusted to give the best operating results in any given installation.

If the pressure in the chamber 12 should be very high, and the apparatus should for any reason get beyond its operating range, there would be danger of applying an excessive pressure to the diaphragm of the motor valve. In order to avoid this possibility and at the same time obtain better regulating action, I preferably provide means for maintaining a substantially constant pressure in the chamber 12. This pressure should be only slightly higher than the 15 pounds necessary to produce full opening of the motor valve. In order to obtain this pressure regulation and still retain a simple compact construction, the casing 11 is shaped to provide a chamber 83 which is separated from the chamber 12 by a partition 84. The chamber 83 is supplied with compressed air or other fluid under pressure from a suitable source through a pipe 85, and this fluid flows into the chamber 12 under the control of a valve member or piston 87 which cooperates with an annular valve seat 88. The seat 88 is formed in a valve cage 89 which is screw-threaded into the partition 84. The valve piston is slidably supported in the cage and is preferably provided with a disk 91 at its lower end which in closed position contacts with the valve seat. The outside of the valve piston is hexagonal, the same as valve piston 16, to allow a space for the flow of fluid. A small coiled compression spring 92 is mounted in the hollow interior of the valve piston with its upper end supported by a plug 93 screw-threaded to the valve cage 89. The plug 93 is formed with an opening 94 therethrough to allow fluid to enter the valve cage from the chamber 83.

In order to control the pressure in the chamber 12, I provide a flexible diaphragm 96 which forms one wall of the chamber. This diaphragm is clamped at its periphery between the casing 11 and a cap 97. The diaphragm 96 is located in a plane perpendicular to the direction of movement of the valve 87, and these parts are connected by means of a pusher post 98 mounted on the diaphragm and extending upwardly through the lower portion of the valve cage 89 and into contact with the disk 91. This pusher post is similar to the pusher post 28, and is provided with a square outside and a central longitudinal passage 100. The upper end of the pusher post is beveled to provide a comparatively sharp annular surface for contact with the disk 91, and a flange 101 is provided on the pusher post to contact with the upper surface of the diaphragm 96. An annular pressure plate 102 contacts with the lower surface of the diaphragm, and the parts are held together by means of a nut 104 screw-threaded to the pusher post below the pressure plate. The diaphragm is supported against the fluid pressure by means of a coiled compression spring 105 extending between the pressure plate 102 and a hollow plug 106 screw-threaded to the cap 97 and provided with a vent 107. It will be noted that in relation to the valve 87, the chamber 82 is an inlet chamber, and the chamber 12 is an outlet chamber. Furthermore, in relation to the mechanism as a whole, the chamber 12 is an intermediate chamber.

The operation of this embodiment of the invention will now be apparent from the above disclosure. Compressed air or other fluid under pressure enters the chamber 83 through the pipe 85 and flows past the valve 87 into the chamber 12, where its pressure is effective on the diaphragm 96 which is balanced by the spring 105. The pusher post 98, actuated by the diaphragm and spring, holds the valve 87 open sufficiently to maintain the desired pressure in the chamber 12 irrespective of the initial pressure of the fluid or the rate at which it is withdrawn from the chamber 12. If no fluid is being withdrawn, the disk 91 will contact with the annular seat 88 and stop all flow. In case leakage should occur past the disk 91, tending to increase the pressure in chamber 12 beyond its proper value, the diaphragm will move the pusher post downwardly and out of contact with the disk, thereby allowing fluid to exhaust from the chamber 12 through the passage 100 and vent 107. The pusher post under these circumstances acts as a pressure relief valve.

From the chamber 12 the fluid flows under the control of the valve 16 into the chamber 14, when its pressure is effective on the diaphragm 26 which is balanced by the force transmitted through the lever system. The pressure in the chamber 14 is also effective on the diaphragm 43 of the motor valve 41, the diaphragm chamber 39 of the motor valve being connected to the chamber 14 by means of the pipe 38 and passage 37. Consequently, the amount of compression of the spring 44 and the position of the valve member 46 are determined by the fluid pressure in the chamber 14. The fluid pressure in the pipe 42 at the delivery side of the motor valve is transmitted through the pipe 51 to the diaphragm chamber 52, where it is effective on the diaphragm 55 and tends to move the diaphragm upwardly against the force of the spring 59. So long as conditions are stable and the pressure in chamber 52 remains constant, there will be just sufficient force transmitted through the rod 74 and the levers 67 and 65 to hold the diaphragm 26 against the fluid pressure in the chamber 14. This same fluid pressure, acting on the diaphragm 43, will hold the valve member 46 open just enough to maintain the pressure at the delivery side of the motor valve constant. Under these conditions, the valve disk 20 will be in contact with both the valve seat 18 and the pusher post 28, and there will be no flow of the control fluid.

If now the pressure at the delivery side of the motor valve should increase for any reason, the increased pressure will force the diaphragm 55 upwardly, thus decreasing the force transmitted through the rod 74 and the lever system to the pusher post 28. The pusher post will thereupon move upwardly and allow fluid to exhaust from the chamber 14 through the passage 30 and the vent 31 until the pressure has decreased sufficiently to produce a balanced condition once more. At the same time, the decrease in pressure on the diaphragm 43 will allow the spring 44 to move the valve member 46 toward its closed position, thus decreasing the flow through the motor valve and limiting the rise in pressure on the discharge side thereof. It will be seen that during this operation, no control fluid was supplied through the pipe 85.

If now the pressure at the delivery side of the motor valve should decrease for any reason, the spring 59 will move the diaphragm 55 slightly downward, thus increasing the force transmitted through the rod 74 and the lever system to the pusher post 28. The pusher post will thereupon move downwardly, carrying the valve disk 20 out of contact with the seat 18 and allowing sufficient fluid to enter the chamber 14 to increase the pressure on the diaphragm 26 and restore a balanced condition. The increased pressure will be effective on the diaphragm 43 of the motor valve, and will result in an increased opening for the valve, which will increase the flow and limit the decrease in pressure on the discharge side of the motor valve. During this operation, the valve 87 will allow sufficient control fluid to flow from the pipe 85 into the chamber 12 to maintain the pressure therein substantially constant.

From the above it will be apparent that the valve member 46 will be given a definite and predetermined position dependent upon the pressure at the delivery side of the motor valve, so long as this pressure is within the range of the apparatus. If the pressure reaches a point outside of the range, the motor valve will be either fully closed, if the pressure is too high, or fully open, if the pressure is too low. The range of the apparatus can be readily adjusted by turning the screw 72, thus moving the roller 70 and changing the mechanical advantage of the lever system. By adjusting the apparatus for a minimum range, very close pressure regulation can be obtained. If there is a tendency toward hunting, this can be overcome by increasing the range. The speed of movement of the motor valve can be controlled by adjusting the needle valve 48.

It will be seen that the valve mechanism uses control fluid only when it is necessary to increase the pressure on the motor valve. When the pressure is to be decreased, the apparatus merely exhausts fluid from the chambers 14 and 39, and when conditions are stable there is no flow of the control fluid whatsoever. The operation is thus very economical as compared to prior constructions. The ball connection 63 between the lever 65 and the pusher post 28 greatly decreases friction and contributes to sensitive operation. The same thing is true of the ball and socket connection 76—78 between the rod 74 and the pressure plate 57. The spring 80 protects the lever system against the possibility of excessive loading. The entire construction is comparatively simple and inexpensive to manufacture and install.

Figure 7:
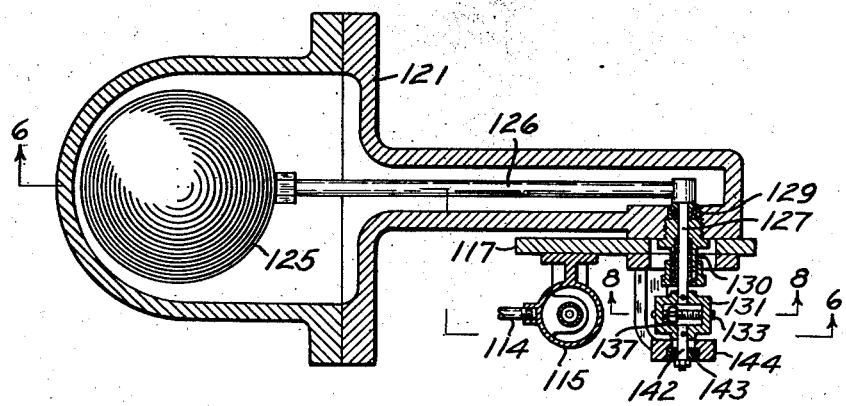
Fig. 7 is a section on the line 7—7 of Fig. 6.
Figure 8:
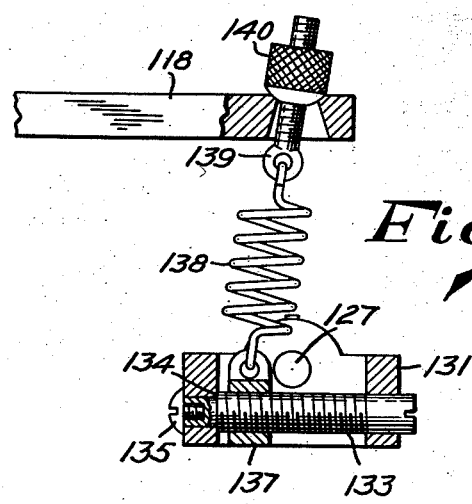
Fig. 8 is an enlarged section on the line 8—8 of Fig. 7.

In Figs. 6 to 8 inclusive I have illustrated an embodiment which has been modified in certain respects to control liquid level rather than fluid pressure. This construction comprises a tank 110 which is supplied with liquid through a pipe 111, the rate of flow in the pipe being controlled by means of a motor valve 112 which is similar to the valve 41. The motor valve 112 is controlled by fluid pressure transmitted thereto through a small pipe 114 leading from a casing 115 to which a suitable fluid, such as compressed air, is supplied through a small pipe 116. The casing 115 is similar to the casing 11 and has the same type of valve mechanism mounted therein. This casing is mounted on a plate 117. The pressure transmitted to the motor valve 112 is controlled by varying the load on a lever 118 pivotally fastened to the plate 117 by means of a pin 119. This lever 118 is similar to the lever 65, but is preferably somewhat longer.

In order to control the level of the liquid in the tank 110, I provide means whereby variations in the liquid level will cause variations in the loading of the lever 118. This is preferably accomplished by utilizing a float which rises and falls with the liquid level, the float being connected to the lever by means including a spring. In the construction illustrated, which is suitable for controlling the level in a tank under pressure, I have provided a hollow float chamber 121 which is attached to the plate 117 and which is connected to the tank 110 by means of pipes 122 and 123 located respectively above and below the normal liquid level. A float 125, which may be a hollow metal sphere, is mounted on one end of a horizontal arm 126 within the float chamber 121. It will be understood that this float may be solid, and it may be counterweighted if necessary to provide buoyancy. The term "float" in the specification and claims is not to be limited to a body which is lighter than an equal volume of the liquid. The arm 126 is connected to a horizontal shaft 127 arranged at right angles thereto and mounted in a ball bearing 129 (Fig. 7). The shaft 127 extends outwardly from the float chamber 121 through a stuffing box 130, and carries on its outer end a bracket 131 in which is rotatably mounted a screw 133 extending parallel to the arm 126. Axial movement of the screw 133 is prevented by a shoulder 134 thereon and by a small screw 135 in the adjacent end thereof, as shown particularly in Fig. 8. The screw 133 carries a nut 137 which is connected to the free end of the lever 118 by means of a coiled tension spring 138, an eye-bolt 139, and a nut 140. The nut 140 is knurled, and it is provided with a spherical lower surface which contacts with a spherical socket in the lever to form a swivel joint. It will be noted that the screw 133 can be rotated to vary the position of the nut 137 relative to the axis of the shaft 127, thus varying the mechanical advantage of the connection between the float 125 and the valve mechanism in the casing 115. The screw 133 and nut 137 form a lever having an adjustable effective length. It will also be noted that the parts are so constructed that the nut 137 can be located at either side of the axis of the shaft 127, for a purpose which will be explained hereinafter.

In order to support the bracket 131 and shaft 127 more firmly, I preferably secure to the outer end of the bracket a short shaft 142 arranged in axial alignment with the shaft 127. This shaft 142 is supported in a ball bearing 143 mounted in a frame 144 secured to the plate 117.

The operation of this embodiment will now be apparent from the above disclosure. The liquid level in the float chamber 121 will of course be the same as that in the tank 110, and any variation in this level will cause the float 125 to move up or down. This will vary the tension of the spring 138 and the load applied to the lever 118, thus varying the fluid pressure transmitted through the pipe 114 to the motor valve 112. As a result, the motor valve will move and either increase or decrease the flow in the pipe 111, as may be necessary to restore the desired liquid level in the tank.

With the construction illustrated, the spring 138 can be comparatively light, and its tension need vary only slightly throughout the operating range. This makes it possible to use a small float and still obtain accurate control, with the degree of immersion of the float remaining substantially constant at all positions. Furthermore, the light spring results in light bearing loads, with practically no friction, and very sensitive operation. By turning the screw 133 it is possible to vary the horizontal distance between the nut 137 and the axis of the shaft 127, thus changing the operating range, that is, the distance the float 125 must move in order to move the motor valve from the fully closed to the fully open position or vice versa. By adjusting the nut 137 to the right hand side of the shaft 127 in Fig. 8, the operation will be reversed, and a rising liquid level will cause the fluid pressure transmitted to the motor valve to increase instead of decrease. This is necessary in case the motor valve is arranged to control the liquid level by controlling the discharge of liquid from the tank, or in case the motor valve is of a type which closes with an increasing control pressure. By adjusting the nut 140 it is possible to vary the liquid level which will be maintained. A slight adjustment of this nut will be necessary when the operating range is adjusted, if the normal liquid level is to remain the same, for it will be apparent from Fig. 8 that a variation in the position of the nut 137 will cause a slight change in the tension of the spring 138. The initial tension can be restored by a slight adjustment of the nut 140. It will be apparent from Fig. 6 that the vertical movement of the float 125 is limited by the walls of the float chamber, even though the liquid level should for some reason get beyond the operating range. The spring 138 prevents any excessive force from being applied to the lever 118. The construction is simple and inexpensive, and if properly installed and adjusted it will maintain the desired liquid level with great accuracy and without hunting.

Having thus described my invention, what I claim as new and desire to secure by Letters Patent is:

1. A pilot valve mechanism comprising a casing shaped to provide an inlet chamber, an intermediate chamber and an outlet chamber, a valve to control the flow of fluid from the inlet chamber to the intermediate chamber, means including a flexible diaphragm subjected to the fluid pressure in the intermediate chamber and connected to the valve to actuate the same and maintain a substantially constant pressure in the intermediate chamber, a second valve to control the flow of fluid from the intermediate chamber to the outlet chamber, a second flexible diaphragm subjected to the fluid pressure in the outlet chamber and connected to the second valve to actuate the same, a control device automatically movable in accordance with a condition to be controlled, and a mechanical connection between the control device and the second diaphragm to provide a variable loading for the second diaphragm.

2. A pilot valve mechanism for regulating a fluid pressure actuated controller, said mechanism comprising means providing a chamber having an inlet and an outlet, valve means to control the flow of fluid through both the inlet and the outlet, a single flexible diaphragm subjected to the fluid pressure in the chamber and arranged to actuate the valve means, a passage communicating with the chamber and adapted to transmit the fluid pressure therein to the controller, a second flexible diaphragm arranged to be subjected to fluid pressure on one side, a lever, a tension rod connecting the second diaphragm to the lever, a lever connected to the first mentioned diaphragm to load the same, and an adjustable connection between said levers.

3. A pilot valve mechanism for regulating a fluid pressure actuated controller, said mechanism comprising means providing a chamber for fluid under pressure, valve means to regulate the fluid pressure in the chamber, a flexible diaphragm subjected to the fluid pressure in the chamber and arranged to actuate the valve means, a passage communicating with the chamber and adapted to transmit the fluid pressure therein to the controller, a second flexible diaphragm arranged to be subjected to fluid pressure on one side, a pressure plate located on the other side of the second diaphragm to support the same against the fluid pressure, the pressure plate being shaped to provide a socket, a comparatively heavy spring forming a loading for the pressure plate, a tension rod having a spherical end portion located in the socket, means connecting the tension rod with the first mentioned diaphragm to load the same, and a comparatively light spring arranged to hold the spherical portion in position under normal conditions but adapted to yield in case the tension in the rod exceeds a predetermined amount.

PAUL C. TEMPLE.